US011870127B2

(12) United States Patent
Courtney et al.

(10) Patent No.: US 11,870,127 B2
(45) **Date of Patent: *Jan. 9, 2024**

(54) WIRELESS CONTROL DEVICE HAVING AN ANTENNA ILLUMINATED WITH VISIBLE LIGHT

(71) Applicant: Lutron Technology Company LLC, Coopersburg, PA (US)

(72) Inventors: Brian Michael Courtney, Bethlehem, PA (US); Matthew Philip McDonald, Phoenixville, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/745,439

(22) Filed: May 16, 2022

(65) Prior Publication Data

US 2023/0033397 A1 Feb. 2, 2023

Related U.S. Application Data

(63) Continuation of application No. 16/679,915, filed on Nov. 11, 2019, now Pat. No. 11,362,408, which is a
(Continued)

(51) Int. Cl.
*H01Q 1/06* (2006.01)
*G08C 17/02* (2006.01)
(Continued)

(52) U.S. Cl.
CPC ............... *H01Q 1/06* (2013.01); *G08C 17/02* (2013.01); *H01Q 1/244* (2013.01); *H01Q 1/362* (2013.01); *H01Q 1/38* (2013.01); *G08C 2201/30* (2013.01)

(58) Field of Classification Search
CPC .......... H01Q 1/06; H01Q 1/244; H01Q 1/362; H01Q 1/38
See application file for complete search history.

(56) References Cited

U.S. PATENT DOCUMENTS 2,473,981 A 6/1949 Wood
6,262,686 B1 7/2001 Delarminat et al.
(Continued)

FOREIGN PATENT DOCUMENTS

CN 2626857 Y 7/2004
CN 201303044 Y 9/2009
(Continued)

OTHER PUBLICATIONS

International Preliminary Report on Patentability dated May 1, 2018 in corresponding International Application No. PCT/US2016/059445.
(Continued)

*Primary Examiner* — Hoang V Nguyen
(74) *Attorney, Agent, or Firm* — Duane Morris LLP

(57) ABSTRACT

A wireless control device, such as a system controller for a load control system, may comprise a light-transmissive cover for an antenna that may be illuminated to provide feedback to a user of the load control system. The light-transmissive cover may receive light energy from a light-generating circuit to provide a visible display of the light energy. The wireless control device may be mounted to, for example, a ceiling, and the light-transmissive cover may extend from the wireless control device (e.g., down from the ceiling). The light-transmissive cover may be viewed by a user at large viewing angles and at a distance away from the wireless control device, which may simplify and improve reliability of commissioning of the load control system as
(Continued)

well as speed up troubleshooting of the load control system after commissioning is completed.

20 Claims, 9 Drawing Sheets

Related U.S. Application Data continuation of application No. 15/337,543, filed on Oct. 28, 2016, now Pat. No. 10,476,126.

(60) Provisional application No. 62/248,754, filed on Oct. 30, 2015.

(51) Int. Cl.
*H01Q 1/24* (2006.01)
*H01Q 1/36* (2006.01)
*H01Q 1/38* (2006.01)

(56) References Cited

U.S. PATENT DOCUMENTS

| | | | |
|---|---|---|---|
| 8,199,010 | B2 | 6/2012 | Sloan et al. |
| 8,541,931 | B2 | 9/2013 | Yang |
| 9,337,943 | B2 | 5/2016 | Mosebrook et al. |
| 2001/0048589 | A1 | 12/2001 | Bradenberg et al. |
| 2010/0052574 | A1 | 3/2010 | Blakeley et al. |
| 2010/0052576 | A1 | 3/2010 | Steiner et al. |
| 2012/0082461 | A1* | 4/2012 | Meyer .............. H04N 21/42206 398/106 |
| 2012/0248990 | A1 | 10/2012 | Goyal et al. |
| 2014/0001846 | A1 | 1/2014 | Mosebrook et al. |
| 2015/0249336 | A1 | 9/2015 | Raneri |
| 2016/0183344 | A1* | 6/2016 | Chitta .................. G05B 19/102 700/86 |

FOREIGN PATENT DOCUMENTS

| | | | | |
|---|---|---|---|---|
| CN | 202905073 | U | 4/2013 | |
| CN | 204576776 | U | 8/2015 | |
| EP | 2515619 | A1 | 10/2012 | |
| EP | 2993130 | A1 * | 3/2016 | ......... B64D 45/0059 |

OTHER PUBLICATIONS

International Search Report and Written Opinion dated Jan. 24, 2017 in corresponding International Application No. PCT/US2016/059445.

Radio Powr Savr™ , Wireless Occupancy and Vacancy Sensor, pp. 1-6, 369-480 Rev B 1, Aug. 23, 2011.

Radio Powr Savr™, Installation Instructions, Wireless Battery-Powered Occupancy and Vacancy Sensors, P/N 041-315a, May 2011 @ 2011 Lutron Electronics Co., Inc.

Office Action issued for corresponding Canadian Patent Application No. 3,151,813 dated Mar. 14, 2023, 4 pages.

* cited by examiner

WIRELESS CONTROL DEVICE HAVING AN ANTENNA ILLUMINATED WITH VISIBLE LIGHT

CROSS REFERENCE TO RELATED APPLICATIONS

This application is a continuation of U.S. patent application Ser. No. 16/679,915, filed Nov. 11, 2019, which is a continuation of U.S. patent application Ser. No. 15/337,543, filed Oct. 28, 2016, now U.S. Pat. No. 10,476,126, which claims the benefit of U.S. Provisional Patent Application No. 62/248,754, filed Oct. 30, 2015, entitled WIRELESS CONTROL DEVICE HAVING AN ANTENNA ILLUMINATED WITH VISIBLE LIGHT, the entire disclosures of which are incorporated by reference herein.

BACKGROUND

Buildings, such as homes, office buildings, warehouses, factories, and the like, often use load control systems for security, networking and communications, safety and load control. These systems typically include devices installed on (or behind) a drop ceiling, such as security cameras, wireless routers, speakers, smoke alarms, sprinklers, occupancy sensors, daylight sensors, temperature sensors, etc. Many of these devices may include indicator lights used to communicate a status of the device to the user and the installer of the device. The size and quantity of these devices may be distracting to users of the space, and accordingly, design efforts may attempt to minimize the size of devices which are visibly mounted to the ceiling.

One difficulty with minimizing device size is that many of these devices contain one or more antennas for communication via radio-frequency (RF) with other devices in the system. Antennas which communicate at low or sub-gigahertz frequencies may be several inches in length in order to achieve excellent antenna gain, which may cause the device to be unsightly and distracting to the user. Methods to mitigate the undesirable appearance may include reducing the size of the antenna, or installing all or part of the device or the antenna in a hidden area (i.e., behind the ceiling tile, or in an electrical closet). However, such methods may compromise the antenna gain, thereby reducing the communication range of the antenna. Accordingly, there is a need for a device design with a sufficiently large antenna to allow for excellent antenna gain without drawing undue attention to the device.

SUMMARY

As described herein, a wireless control device (e.g., a system controller) for a load control system may have a protruding structure, such as a protruding antenna structure, which may be illuminated with visible light energy in such as way that the appearance of the antenna structure is not distractive, but conveys a sense of purpose or intention to a user of the load control system. In addition, the antenna structure may be used for relaying information visually to the user of the load control system. The antenna structure may have a light-transmissive cover that may be illuminated to provide sleek aesthetic appearance as well as to provide feedback to the user of the load control system. The wireless control device may be mounted to, for example, a ceiling, and the light-transmissive cover may extend from the wireless control device (e.g., down from the ceiling by a distance equal to or greater than approximately 0.5 inches). The light-transmissive cover may be viewed by a user at large viewing angles and at a distance away from the wireless control device, which may simplify and improve reliability of commissioning of the load control system as well as speed up troubleshooting of the load control system after commissioning is completed.

The load control system may comprise at least one input device for issuing commands to at least one load control device for controlling a respective energy consuming device of the load control system, with the at least one input device, at least one load control device and wireless control device being in wireless communication. The antenna may receive wireless signals from the at least one load control device or at least one input device.

The wireless control device may include a control circuit (e.g., a processor circuit), a wireless communication circuit, and an antenna coupled to the wireless communication circuit for at least transmitting wireless signals to the at least one load control device of the load control system. The control circuit may be coupled to the wireless communication circuit, and may control the generation of signals by the wireless communication circuit to be transmitted by the antenna. The wireless control device may also include a visible-light-generating circuit coupled to the control circuit and a light transmissive cover that surrounds the antenna, and receives light energy from the light-generating circuit to visibly display the light energy.

The wireless control device may further comprise a housing containing the control circuit, the wireless communication circuit, and the light-generating circuit. The antenna may comprise an antenna element (e.g., helical antenna element) that extends from the housing and is surrounded by the light-transmissive cover. The wireless control device may comprise a pair of orthogonally-disposed antennas for increasing the reliability of wireless transmission and reception. The housing may be designed to be recessed into an opening of a building structure, with the housing having a visible surface through which the antenna cover extends. The housing may be a two part housing with a printed circuit board held between parts of the two part housing.

The light-transmissive cover may comprise a translucent plastic member extending from the housing and surrounding the antenna and the visible light generating circuit comprises at least one light-emitting diode. The light-generating circuit may comprise at least one light emitting diode (LED) that is mounted to the printed circuit board and is capable of producing nearly all colors in the visible light spectrum. The light-generating circuit may comprise a plurality of LEDs capable of producing nearly all colors in the visible light spectrum. The antenna cover may comprise a translucent plastic extending member surrounding the antenna element and extending through an opening in the housing. The antenna cover may have a tapering cylindrical shape.

The wireless control device may further comprise a light pipe optically coupling energy from the at least one light-emitting diode to the light-transmissive cover and a reflective shroud surrounding the light pipe to reduce loss of light energy from the light pipe. A light reflecting surface on the printed circuit board adjacent the at least one light-emitting diode may be provided to facilitate reflection of light energy from the at least one light-emitting diode into the light pipe. The reflective shroud may be substantially frusto-conically shaped surrounding the light pipe and the light pipe may comprise two half sections that comprise two partial substantially frusto-conical sections and the housing comprises a two part housing with the light pipe, reflective shroud and antenna cover held in place when the two-part housing is assembled. There may be at least one alignment member on one or both parts of the housing for aligning the reflective shroud and light pipe and the antenna cover has a flange for securing the antenna cover between the housing and the reflective shroud.

The wireless control device may comprise a network communication circuit that may enable the wired or wireless control device to connect to a network (e.g., wirelessly by radio frequency). The wireless control device may also comprise a memory for storing operational characteristics of the wireless control device and may further comprise a user interface coupled to the control circuit. The interface for controlling the control circuit may comprise an external device (e.g., a network device) communicating with the network communication circuit such as a computer, a desktop computer, a laptop computer, a tablet computer or a smart phone.

The visible light energy displayed by the antenna cover may provide visible communication (e.g., to convey visible information) to an occupant of an area in which the wireless control device is located as to the functional status of the wireless control device. The visible communication may be provided by at least one of the light color displayed, the intensity of the color and the frequency of blinking of the color and the functional status may comprise one of a startup boot mode, a normal mode and an error mode. In the normal mode, the antenna cover may display information to the occupant that the wireless control device is transmitting/receiving; identifying a load controller; updating processor firmware; checking LED operation; establishing a wired communication with the network; connecting to a load controller; or in a default state or a recovery mode.

Other features and advantages of the present invention will become apparent from the following description of the invention that refers to the accompanying drawings.

DETAILED DESCRIPTION

Figure 1:
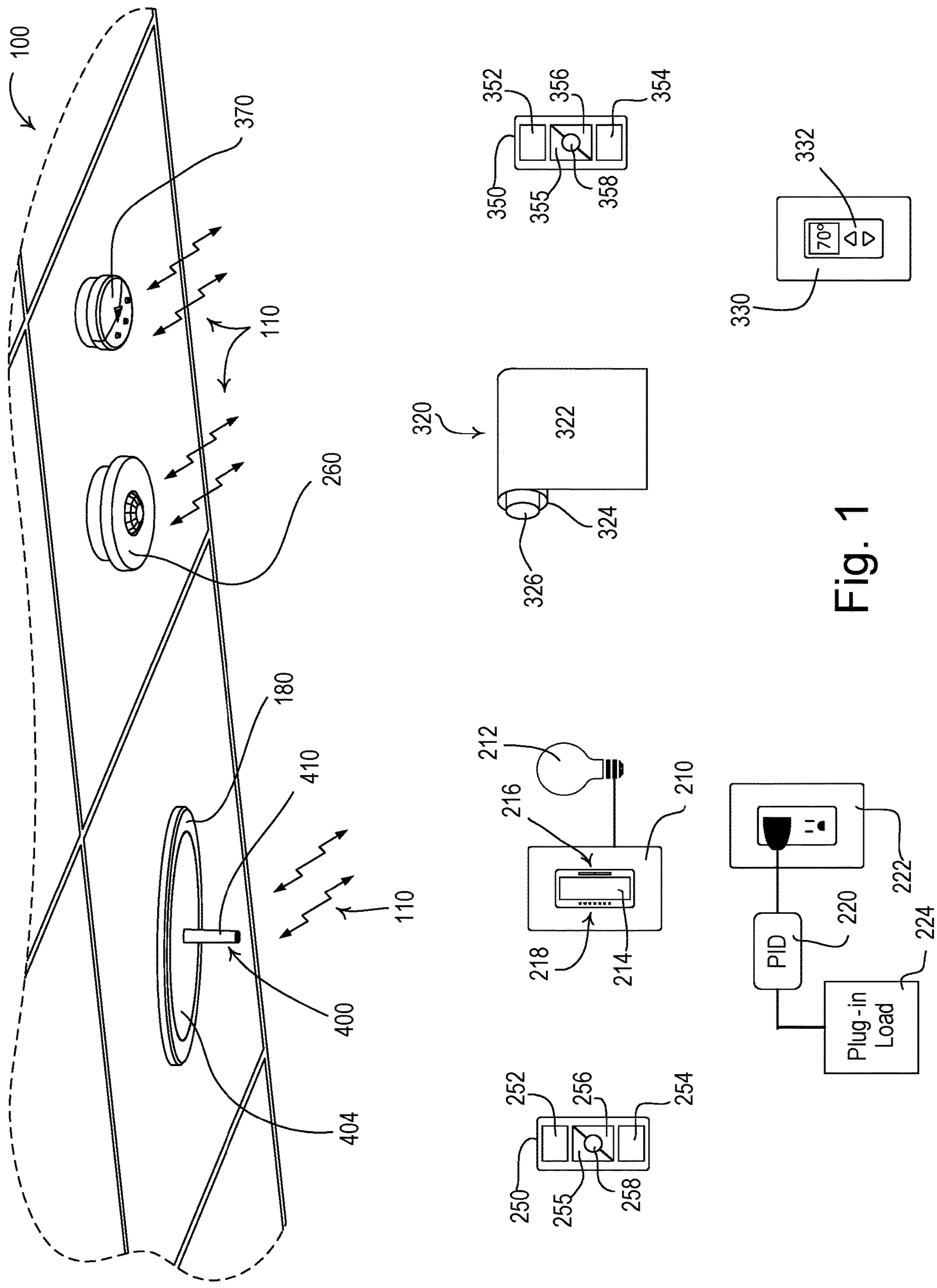
FIG. 1 is a simplified perspective view of a system controller in a simplified load control system and installed in a dropped ceiling and having an extending antenna for RF communication and further wherein the antenna is enclosed by a light-transmissive cover that is illuminated for providing visible communication to a room occupant as to its functional status.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 depicts a simplified example load control system 100 having a wireless control device, e.g., a system controller 180. The load control system 100 may include multiple independent units (rooms or areas) each having control devices, such as input devices and load control devices. For simplicity, only a few of the input devices and load control devices are shown. These input devices and load control devices can be located in the same or different independent units that are in RF transmission range of the system controller 180. Each input device and load control device may be a communication node of the load control system 100.

The load control system 100 may comprise, for example, remote control devices 250, 350 (e.g., battery-powered remote control devices), which may control a dimmer switch 210 and a motorized window treatment 320 (e.g., a motorized roller shade), respectively. Further shown is a plug-in device (PID) 220 for controlling a plug-in load 224, such as a table lamp. The plug-in device 220 is controlled by wireless transmission from a remote control like remote control 250. Also shown is a thermostat 330 for controlling a heating, ventilation and air conditioning (HVAC) system. An occupancy sensor 260 and a light sensor 370 (e.g., a photosensor or a daylight sensor) are depicted mounted to the ceiling. In the example load control system 100 shown in FIG. 1, devices 250, 260, 350, 370 are input devices, while devices 210, 220, 320 and 330 are load control devices. The load control devices are operable to control at least one electrical load in response to a control signal received from an input device. The dimmer switch 210 may control a lighting load 212 and may be remotely controlled by the RF remote control 250, for example. Similarly, the light sensor 370 may be an input device that controls the dimmer switch 210 and the motorized window treatment 320, for example, dimming the light and adjusting the shades based on how much daylight is present.

The system controller 180 may perform the system-wide (or building-wide) control via radio-frequency (RF) communications, as shown by two-way RF signals 110, of one or more of the load control devices (e.g., the dimmer switch 210, motorized window treatment 320, plug-in device controller 220 and thermostat 330 as well as other load control devices located in the same area) for functions such as, but not limited to, demand response and/or timeclock-based functions. For example, to act on a demand response condition, the system controller 180 may override the input devices of one or more of the load control devices (e.g., the dimmer switch 210 and the motorized window treatment 320) and order those load control devices to perform some load-shedding function (e.g., dimming or ambient light control). Thus, the system controller 180 may operate to control load control devices across the load control system 100 in a system-wide manner. As shown by the two way arrows 110, the system controller also includes an RF receiver for receiving RF signals from the various input and load control devices.

The remote controls 250, 350 are operable to transmit RF signals to the load control devices for controlling the various electrical loads in response to user actuations of a plurality of buttons of the remote controls (e.g., to provide manual override). The remote controls 250, 350 each comprise an on button 252, 352, an off button 254, 354, a raise button 255, 355, a lower button 256, 356, and a preset button 258, 358. The remote controls 250, 350 may transmit digital messages including a serial number of the remote control (e.g., a unique identifier), as well as information regarding which of the buttons was actuated, to the various load control devices via the RF signals. For example, the dimmer switch 210 may turn the lighting load 212 on and off in response to actuations of the ON button 252 and the OFF button 254 of the remote control 250, respectively. The dimmer switch 210 may raise and lower the intensity of the lighting load 212 in response to actuations of the raise button 255 and the lower button 256, respectively. The dimmer switch 210 may control the intensity of the lighting load 212 to a preset intensity in response to actuations of the preset button 258. The remote control devices 250, 350 each include an RF transceiver, if a two way device, or an RF transmitter, if a one way device. An example of such an RF remote control is the PICO remote controller manufactured by Lutron Electronics Co., Inc. Examples of battery-powered remote controls are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 7,573,208, issued Aug. 22, 1009, entitled METHOD OF PROGRAMMING A LIGHTING PRESET FROM A RADIO-FREQUENCY REMOTE CONTROL, the entire disclosures of which are hereby incorporated by reference.

The plug-in load control device 220 is adapted to be plugged into a standard electrical receptacle 222 for receiving power from the AC power source. The plug-in device 220 controls the power delivered to a plug-in electrical load 224 (such as, for example, a table lamp or other lighting load, or a television or other appliance), which is plugged into the plug-in load control device. For example, the plug-in device 220 may be operable to switch the plug-in load 224 on and off in response to the RF signals received from the remote control 250 and occupancy sensor 260. Alternatively, the plug-in device 220 may be operable to control the amount of power delivered to the plug-in electrical load 224, for example, to adjust the lighting intensity of a table lamp plugged into the plug-in device. In addition, the load control system 100 could alternatively comprise a controllable electrical receptacle (not shown) having an integrated load control circuit for controlling plug-in loads, or a controllable circuit breaker (not shown) for control of electrical loads that are not plugged into electrical receptacles, such as a water heater.

The motorized window treatment 320 (e.g., a motorized roller shade) may be positioned in front of one or more windows for controlling the amount of daylight entering the building. The motorized window treatments 320 each comprise a flexible shade fabric 322 rotatably supported by a roller tube 324. Each motorized window treatment 320 is controlled by an electronic drive unit (EDU) 326, which may be located inside the roller tube 324. The electronic drive unit 326 is operable to rotate the respective roller tube 324 to move the bottom edge of the shade fabric 322 to a fully-open position and a fully-closed position, and to any position between the fully-open position and the fully-closed position (e.g., a preset position). Specifically, the motorized window treatment 320 may be opened to allow more daylight to enter the building and may be closed to allow less daylight to enter the building. In addition, the motorized window treatment 320 may be controlled to provide additional insulation for the building, e.g., by moving to the fully-closed position to keep the building cool in the summer and warm in the winter. Alternatively, the motorized window treatments 320 could comprise other types of daylight control devices, such as, for example, motorized draperies, roman shades, pleated shades, or blinds, tensioned roller shade systems for non-vertical windows (e.g., skylights), controllable window glazings (e.g., electrochromic windows), controllable exterior shades, or controllable shutters or louvers. Examples of motorized window treatments are described in commonly-assigned U.S. Pat. No. 6,983,783, issued Jan. 10, 2006, entitled MOTORIZED SHADE CONTROL SYSTEM, and U.S. Patent Application Publication No. 2012/0261078, published Oct. 18, 2012, entitled MOTORIZED WINDOW TREATMENT, the entire disclosures of which are hereby incorporated by reference.

The temperature control device 330 is operable to control a heating, ventilation, and air-conditioning (HVAC) system (not shown) for adjusting a present temperature $T_{PRES}$ of the building in which the load control system 100 is installed or of a particular room or area of the building. The temperature control device 330 is operable to determine the present temperature $T_{PRES}$ in the building and to control the HVAC system to thus adjust the present temperature in the building towards a setpoint temperature $T_{SET}$. For example, a temperature sensor (not shown) may be operable to measure the present temperature $T_{PRES}$ in the building and transmit the present temperature to the temperature control device 330 via the RF signals. The temperature control device 330 may comprise a respective user interface 332 having a temperature adjustment actuator for adjusting the setpoint temperature $T_{SET}$ and a visual display for displaying the present temperature $T_{PRES}$ in the building or the setpoint temperature $T_{SET}$.

The occupancy sensor 260 is operable to transmit RF signals to the load control devices for controlling the various electrical loads in response to detecting the presence or absence of an occupant in the rooms in which the occupancy sensors are located. The occupancy sensor 260 includes an internal detector, e.g., a pyroelectric infrared (PIR) detector, which is operable to receive infrared energy from an occupant in the space to thus sense the occupancy condition in the space. The occupancy sensor 260 is operable to process the output of the PIR detector to determine whether an occupancy condition (e.g., the presence of the occupant) or a vacancy condition (e.g., the absence of the occupant) is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors.

The occupancy sensor 260 operates in an "occupied" state or a "vacant" state in response to the detections of occupancy or vacancy conditions, respectively, in the space. If the occupancy sensor 260 is in the vacant state and the occupancy sensor determines that the space is occupied in response to the PIR detector, the occupancy sensor changes to the occupied state. In FIG. 1, the dimmer switch 210, the plug-in load control device 220, the temperature control device 330, the motorized window treatment 320, and the temperature control device 330 may be responsive to the RF signals transmitted by the occupancy sensor 260.

The commands included in the digital messages transmitted by the occupancy sensor 260 may comprise an occupied command or a vacant command. For example, in response to receiving an occupied command from the occupancy sensor 260, the dimmer switch 210 may control the intensity of the lighting load 212 to an occupied intensity (e.g., approximately 100%). In response to receiving a vacant command, the dimmer switch 210 may control the intensity of the lighting load 212 to a vacant intensity, which may be less than the occupied intensity (e.g., approximately 0%, i.e., off). If there were more than one occupancy sensor 260, the dimmer switch 210 may control the intensity of the lighting load 212 to the occupied intensity in response to receiving a first occupied command from any one of the occupancy sensors, and to the vacant intensity in response to the last vacant command received from those occupancy sensors from which the occupancy sensor received occupied commands.

Alternatively, the occupancy sensor 260 could be implemented as a vacancy sensor. The load control devices that are responsive to vacancy sensors only operate to disconnect power from the controlled electrical loads in response to the vacancy sensors. For example, the dimmer switch 210 would only operate to turn off the lighting load 212 in response to receiving the vacant commands from the vacancy sensor. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,228,184, issued Jul. 24, 2012, entitled BATTERY-POWERED OCCUPANCY SENSOR; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The daylight sensor 370 is mounted so as to measure a total light intensity in the space around the daylight sensor. The daylight sensor 370 is responsive to a total light intensity measured by an internal photosensitive circuit, e.g., a photosensitive diode. Specifically, the daylight sensor 370 is operable to wirelessly transmit digital messages including a value representative of the total lighting intensity to the relevant load control devices via the RF signals. For example, a digital ballast controller or LED driver (not shown) may control respective lighting loads (not shown) in response to increases in the total lighting intensity measured by the daylight sensor 370. Examples of load control systems having daylight sensors are described in greater detail in commonly-assigned U.S. Pat. No. 8,451,116, issued May 28, 2013, entitled WIRELESS BATTERY-POWERED DAYLIGHT SENSOR, and U.S. Pat. No. 8,410,706, issued Apr. 2, 2013, entitled METHOD OF CALIBRATING A DAYLIGHT SENSOR, the entire disclosures of which are hereby incorporated by reference.

In addition to digital ballast controllers and/or light-emitting diode (LED) drivers for controlling the intensities of LED and fluorescent light sources, the load control system 100 may further include additional elements not depicted here, such as contact-closure output pack to control a damper of the HVAC system for adjusting the amount of air flowing through the damper and thus the present temperature, for example. The load control devices of the load control system 100 may further comprise, for example, one or more of a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a controllable electrical receptacle or a controllable power strip for controlling one or more plug-in electrical loads (such as coffee pots and space heaters); a screw-in luminaire including a dimmer circuit and an incandescent or halogen lamp; a screw-in luminaire including a ballast and a compact fluorescent lamp; a screw-in luminaire including an LED driver and an LED light source; a motor control unit for controlling a motor load, such as a ceiling fan or an exhaust fan; a drive unit for controlling a motorized projection screen; motorized interior or exterior shutters; a thermostat for a heating and/or cooling system; an air conditioner; a compressor; an electric baseboard heater controller; a controllable damper; a variable air volume controller; a fresh air intake controller; a ventilation controller; a hydraulic valve for a radiator or radiant heating system; a humidity control unit; a humidifier; a dehumidifier; a water heater; a boiler controller; a pool pump; a refrigerator; a freezer; a TV or computer monitor; a video camera; an audio system or amplifier; an elevator; a power supply; a generator; an electric charger, such as an electric vehicle charger; an energy storage system (e.g., a battery, solar, or thermal energy storage system), and an alternative energy controller (e.g., a solar, wind, or thermal energy controller).

The input devices of the load control system may also comprise, for example, occupancy sensors, vacancy sensors, daylight sensors, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, battery-powered remote controls, kinetic or solar-powered remote controls, key fobs, cell phones, smart phones, tablets, personal digital assistants, personal computers, laptops, timeclocks, audio-visual controls, key-card switches, safety devices, power monitoring devices (such as power meters, energy meters, utility submeters, and utility rate meters), central controllers, residential, commercial, or industrial controllers, or any combination of these input devices.

The system controller 180 transmits digital messages to the load control devices. However the system controller 180 is also operable to receive digital messages from the input devices and load control devices. Accordingly, the system controller 180 may be operable to collect data from the input devices and load control devices of the load control system 100. The system controller 180 may be operable to transmit a query message to the load control devices, in response to which the load control devices transmit the appropriate data back to the system controller 180.

The system controller may be further operable to collect data (e.g., energy usage information) for use in energy analysis of the load control system. For example, the system controller may be operable to log data from one or more input devices that may be used to predict energy savings of the load control system before load control devices are installed. The load control system may also provide feedback (such as an audible sound) when the load control system adjusts the load in response to the demand response command.

The system controller 180 may additionally be operable to log data from one or more input devices. The system controller 180 may be operable to log occupancy patterns, natural light patterns, glare and shadow patterns, and temperature patterns. The logged data may be used to predict energy savings of the load control system 100 before load control devices are installed. For example, prior to the installation of new ballasts (not shown) (i.e., when non-controllable and/or non-dimmable ballasts are controlling the lamps (not shown)), the system controller 180 may log data from the occupancy sensor 260, the daylight sensor 370, and fixture sensors located in the lighting fixtures (not shown) to determine if the energy savings could be provided if the new controllable ballasts are installed (e.g., due to turning the lights off when the space is unoccupied and/or due to dimming the lights when there is natural light shining into the space). The system controller 180 may also be operable to log data from the input devices and load control devices after the load control devices are installed.

For example, the data collected by the system controller 180 may comprise operational characteristics and settings of the load control devices, number and type of input devices, present modes of operation, energy usage information, light intensities of lighting loads, load failures, occupancy status of spaces, ambient light levels measured by daylight sensors, present capacity of energy storage systems, and status of plug-in electrical loads (e.g., whether plug-in loads are plugged in or not). In addition, the system controller 180 may be operable to determine additional data from the occupancy status information received from the occupancy sensor 260, for example, number of occupants, direction of movement of occupants, security information (such as rooms occupied by unauthorized individuals, energy saving due to reduced usage of electrical lights and heating and cooling in unoccupied rooms, room utilization information (such as conference rooms that are not occupied indicating that the conference rooms are presently available for use), building utilization information (such as information indicating that the building may be operated with more efficiency by consolidating workers), and employee status information (such as information indicating that employees may be working all day or leaving early).

During a setup procedure of the load control system 100, the load control devices may be associated with (e.g., assigned to) one or more of the input devices. For example, the dimmer switch 210 may be assigned to the occupancy sensor 260 by actuating buttons on both the dimmer switch and the occupancy sensor. An example of an assignment procedure for RF control devices is described in greater detail in commonly-assigned U.S. Patent Application Publication No. 2008/0111491, published May 15, 2008, entitled RADIO-FREQUENCY LIGHTING CONTROL SYSTEM, the entire disclosure of which is hereby incorporated by reference. Each load control device may be associated with a plurality of input devices, and each input device may be associated with a plurality of load control devices.

In addition, the operating characteristics and functionality of the load control system 100 may be programmed during the setup procedure. For example, the load control devices are associated with and programmed to be responsive to the input devices. In addition, the preset intensity of the dimmer switch 210 may be programmed using the toggle actuator 214 and the intensity adjustment actuator 216 of the dimmer switch or the buttons 252-258 of the remote control 250. The load control system 100 may be configured using a walk-around programming procedure, for example, as described in greater detail in previously-referenced U.S. Pat. No. 5,905,442. Alternatively, the system controller 180 may be connected to a network, allowing the load control system 100 to be configured using a computer-aided programming procedure via a graphical user interface (GUI) software running on a computing device (e.g., a tablet, a smart phone, a personal computer, or a laptop) coupled to the network (not shown) to create a database that defines the operation of the load control system 100. At least a portion of the database could be uploaded to the load control devices such that the load control devices know how to respond to the input devices during normal operation.

The system controller 180 is operable to determine the digital messages to be transmitted to the load control devices of the load control system 100 in response to digital messages received from the network via a network communication link (not shown). The system controller 180 may also be responsive to digital messages received directly from a demand response remote control (not shown) via the RF signals or a contact closure signal received from an external device. In addition, the system controller 180 may be operable to transmit and receive digital messages via the power lines connected to the system controllers, i.e., via powerline communication (PLC) signals, for example, as described in previously-referenced U.S. Patent Application Publication No. 2013/0181630. Further, the system controller 180 may also be operable to calculate the present position of the sun and, for example, to control the motorized window treatments 320 to prevent sun glare as described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

An example of the load control system 100 is described in greater detail in commonly-assigned U.S. Patent Application Publication No. 2014/0001977, published Jan. 2, 2014, entitled LOAD CONTROL SYSTEM HAVING INDEPENDENTLY CONTROLLED UNITS RESPONSIVE TO A SYSTEM CONTROLLER, the entire disclosure of which is incorporated by reference herein.

As shown in FIG. 1, the system controller 180 is shown recessed into, for example, a dropped ceiling, e.g., a tile ceiling. The system controller 180 has a visible antenna structure 400 extending therefrom. The antenna structure 400 includes a light-transmissive slightly-tapering cylindrical (or terete) cover member that surrounds an RF antenna element, as explained in more detail below. The cover member comprises a light-transmissive cover 410 (e.g., a translucent or diffusive cover) that serves the purposes of protecting the RF antenna element and transmitting visible light energy to the occupant for informational purposes. Since the light-transmissive cover 410 of the antenna structure 400 extends from the system controller 180 (and down from the ceiling as shown in FIG. 1), the light-transmissive cover 410 may be viewed by a user at large viewing angles and at a distance away from the system controller. This ease in visualizing the light-transmissive cover 410 of the system controller 180 may simplify and improve reliability of commissioning of the load control system 100 as well as speed up troubleshooting of the load control system 100 after commissioning is completed.

Figure 2:
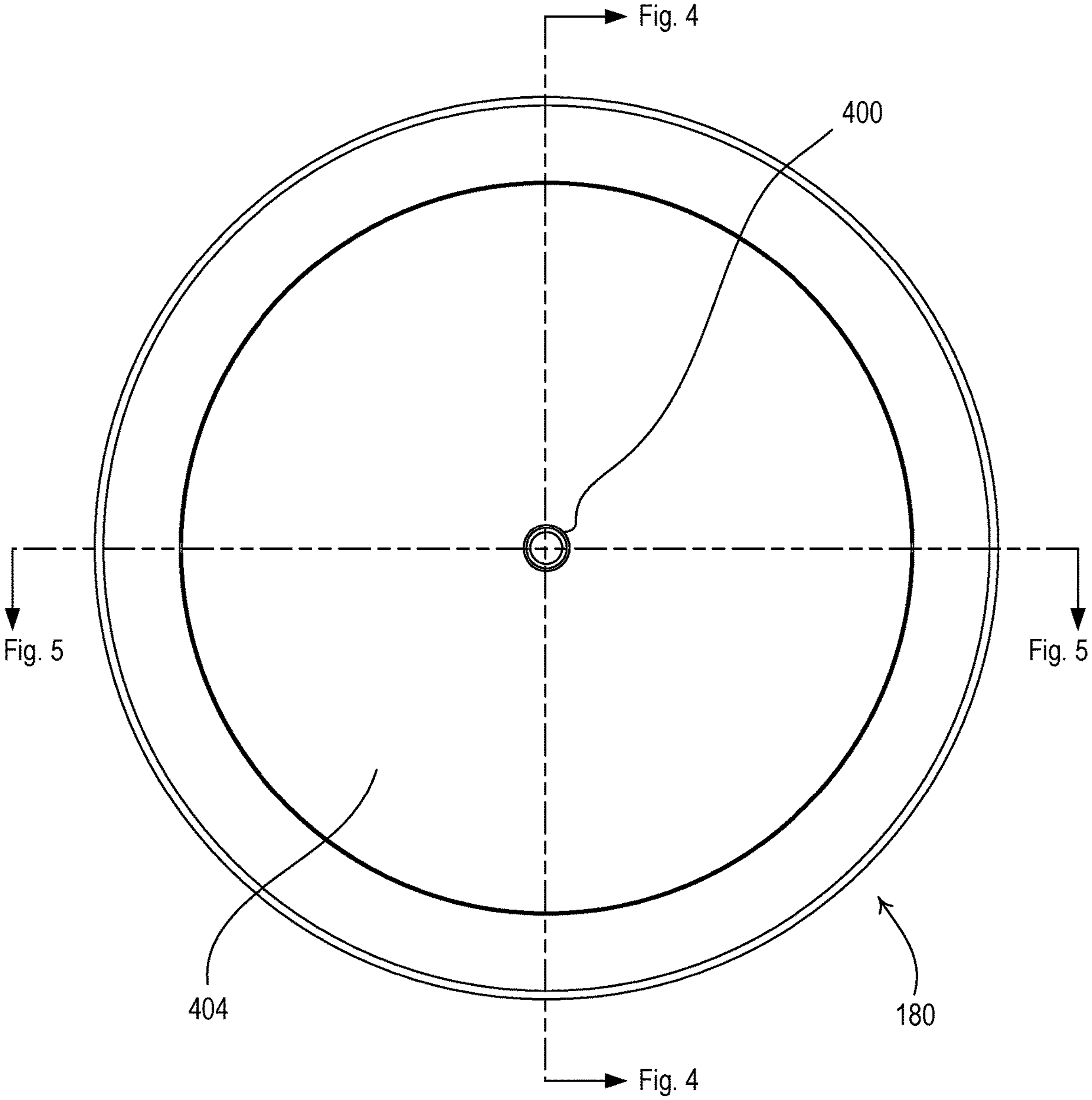
FIG. 2 is a plan view of the system controller of FIG. 1.
Figure 3:
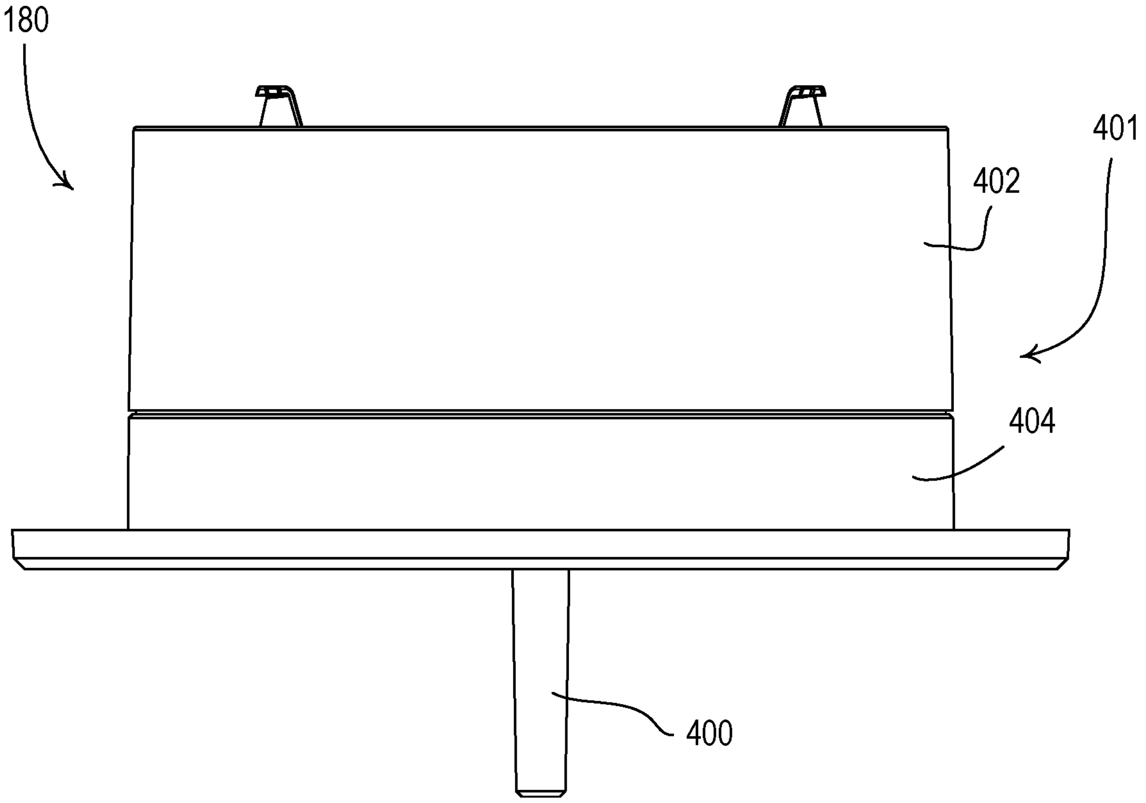
FIG. 3 is a side view of the housing of the system controller of FIG. 1.

FIG. 2 is a plan view of the system controller 180 with the antenna structure 400 extending from a housing 401 of the controller. FIG. 3 is a side view of the housing 401 of the system controller 108. The housing 401 for the system controller 180 is shown as a two-part structure comprising an upper housing part 402 and the lower housing part 404 through which the antenna structure 400 extends. The system controller 180 is designed to be a ceiling-mount unit that can be mounted in a ceiling through an opening, for example, in an opening of a dropped ceiling tile. The opening may be made slightly larger than the diameter of the housing 401. The lower housing part 404 is connected to the upper housing part 402. Suitable means are provided for fastening the housing 401 into the dropped ceiling, for example, into a tile of the dropped ceiling which has a hole cut therein to accept the housing 401. Although the system controller 180 is shown as of the type that can be mounted recessed into a ceiling, other housing designs can be employed, for example, surface mount, wall mount, etc.

Figure 4:
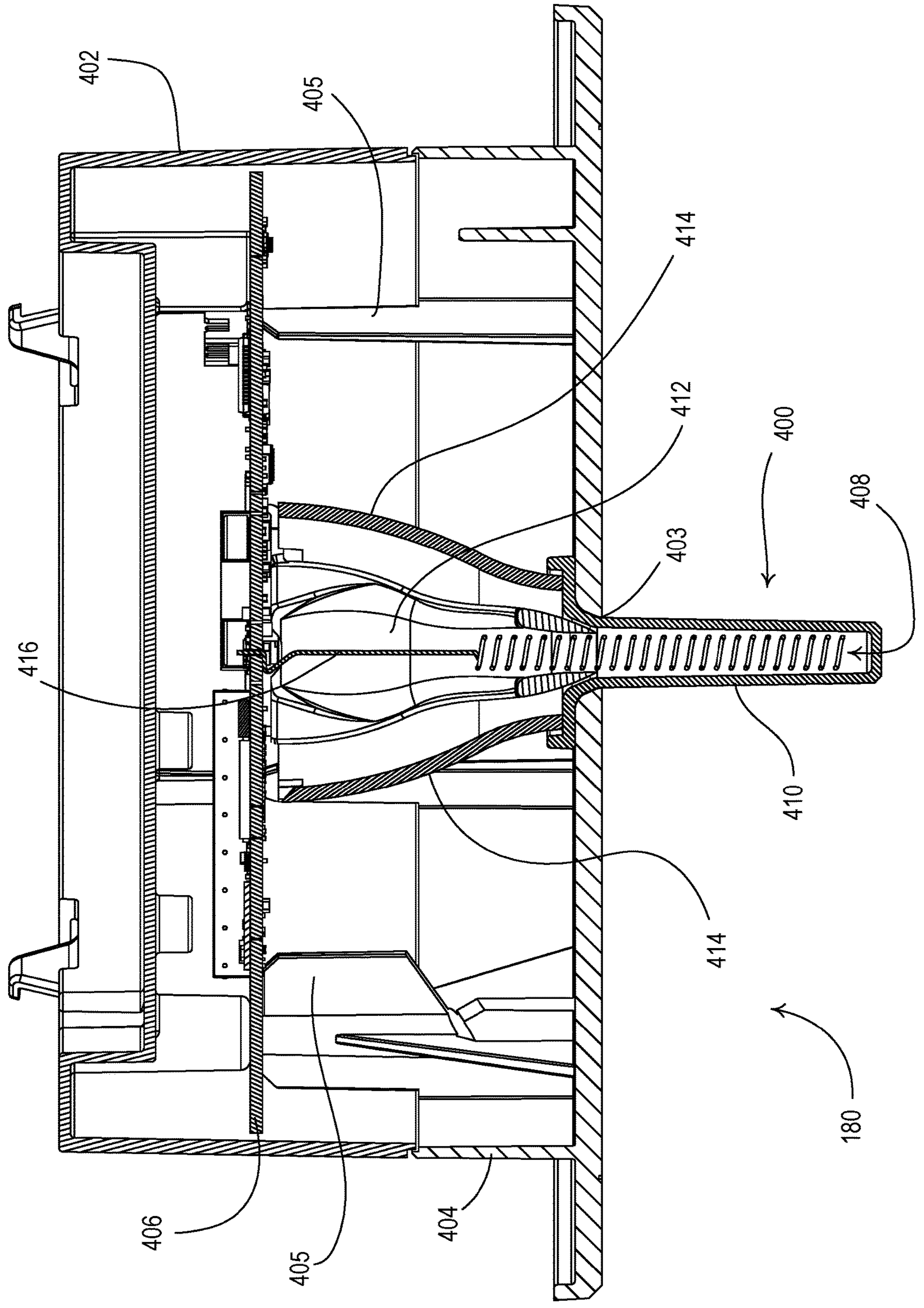
FIG. 4 is a cross-sectional view of the system controller and particularly the antenna structure taken along the vertical line shown in FIG. 2.
Figure 5:
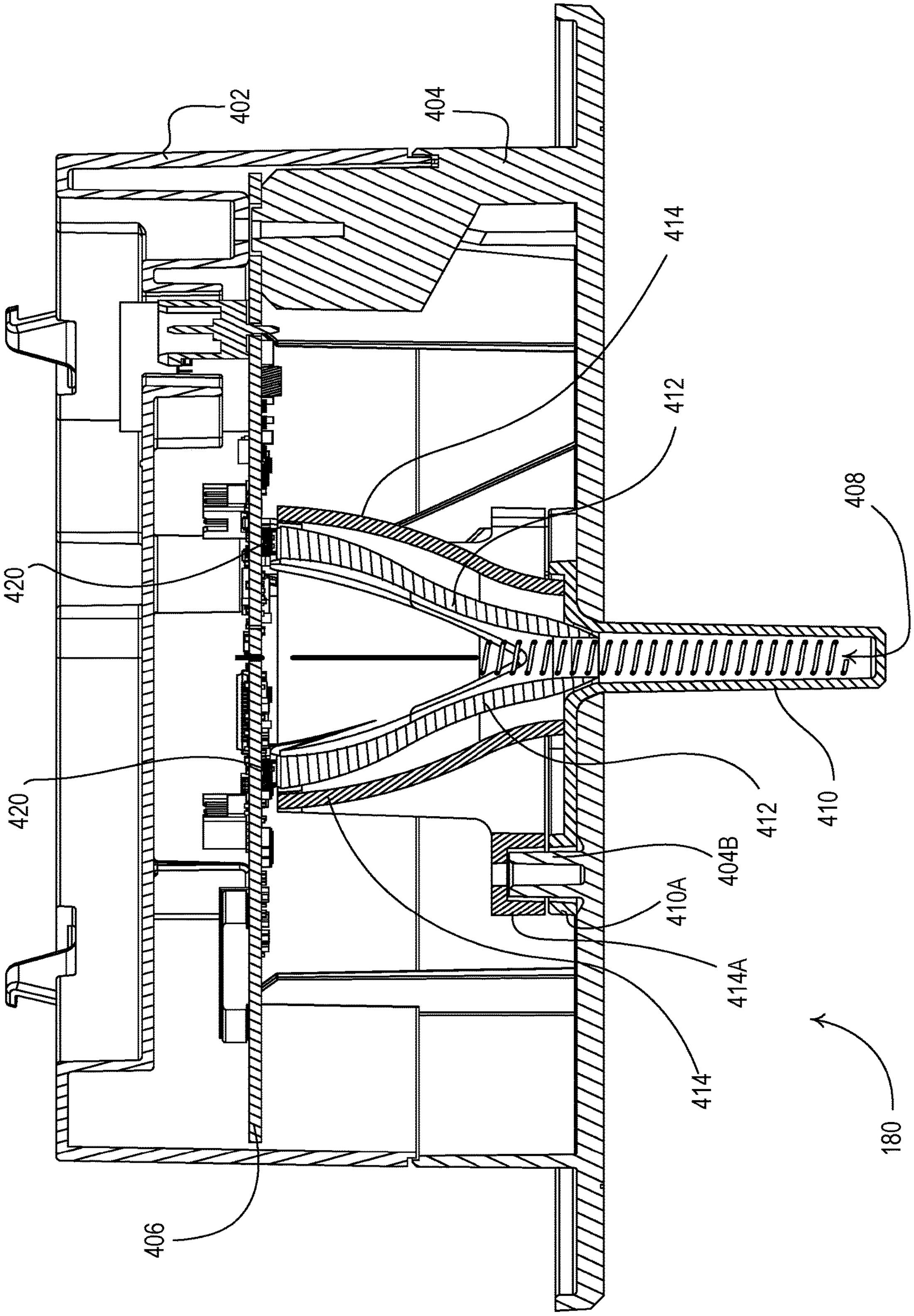
FIG. 5 is a cross-sectional view of the system controller taken along the horizontal line shown in FIG. 2.

FIGS. 4 and 5 are cross-sectional views of the system controller 180 taken along the respective lines. The system controller 180 may have the two-part housing that may include the upper housing part 402 and the lower housing part 404. The upper housing part 402 may be removable from the lower housing part 404 via suitable means, for example, snap fasteners or other fasteners such as screws. The system controller 180 may be provided with a suitable power connection to the AC power source, not shown, as well as a network connection to network 182. The network connection may be wired or wireless or both.

As shown in FIGS. 4 and 5, the upper housing part 402 houses a printed circuit board 406 of the system controller 180 and suitably mounts to the lower housing part 404, for example, via a snapfit, such that the circuit board is supported in the two-part housing. The lower housing part 404 includes suitable flanges 405 that abut against the printed circuit board 406. In addition, the interlocking structure of the two housing parts 402 and 404 maintains the light-transmissive cover 410, the reflective shroud 414 and the light pipe 412 in a fixed relationship, as explained below.

The electronics of the system controller 180 are disposed on the printed circuit board 406 (as will be described in greater detail below). In addition, the printed circuit board 406 provides a connection 416 to an RF antenna element 408 which may be a helical antenna as shown, operating at a frequency of approximately 434 MHz or any other desired frequency. The antenna element 408 is housed at least partly in the light-transmissive antenna cover 410, which extends through an opening 403 in the lower housing part 404 and is visible to the room occupant. The light-transmissive cover 410 is designed to convey light energy to the room occupant to enable the room occupant to determine the functional status of the controller. For example, the light-transmissive cover 410 may extend by at least approximately 0.5 inches from a front surface of the housing 401.

In order to provide light energy to the light-transmissive cover 410, a light pipe 412 is provided that is mounted or positioned adjacent to the lower housing part 404 and held in close proximity to light-emitting elements on the printed circuit board 406. Surrounding the light pipe 412 is a reflective shroud 414, which is provided to reflect light energy that escapes or diffuses out of the light pipe 412 back into the light pipe to maximize the light energy that remains in the light pipe for transmission to the light-transmissive cover 410. The antenna element 408 has a straight portion 416 that is connected to the printed circuit board and is otherwise not attached to light-transmissive cover 410. The light pipe 412 and reflective shroud 414 can be described as approximately curved frusto-conical sections. The light-transmissive cover 410 may be made of a suitable plastic material, for example, polycarbonate.

Figure 6:
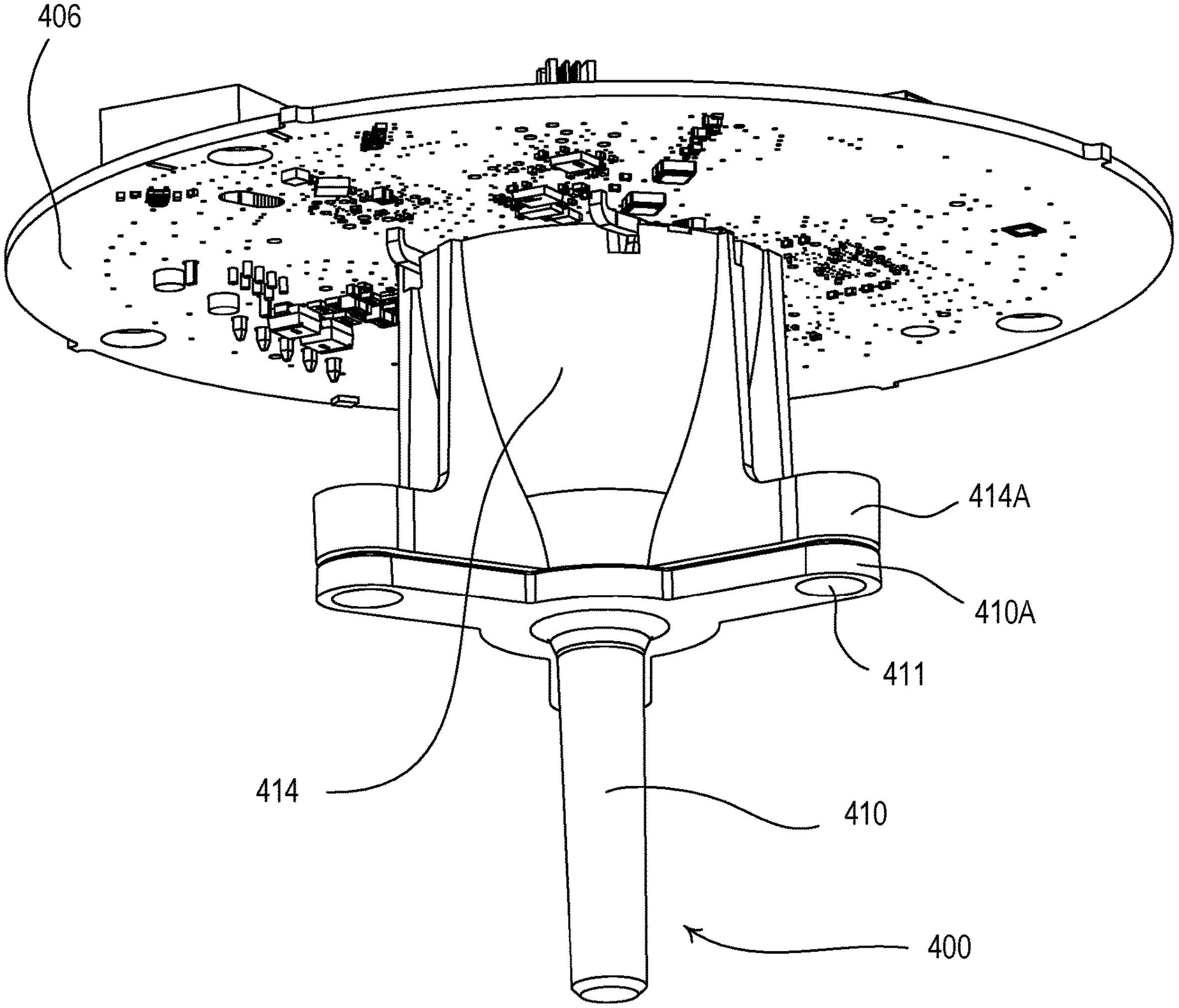
FIG. 6 is a perspective view of a printed circuit board and antenna structure of the system controller.
Figure 7:
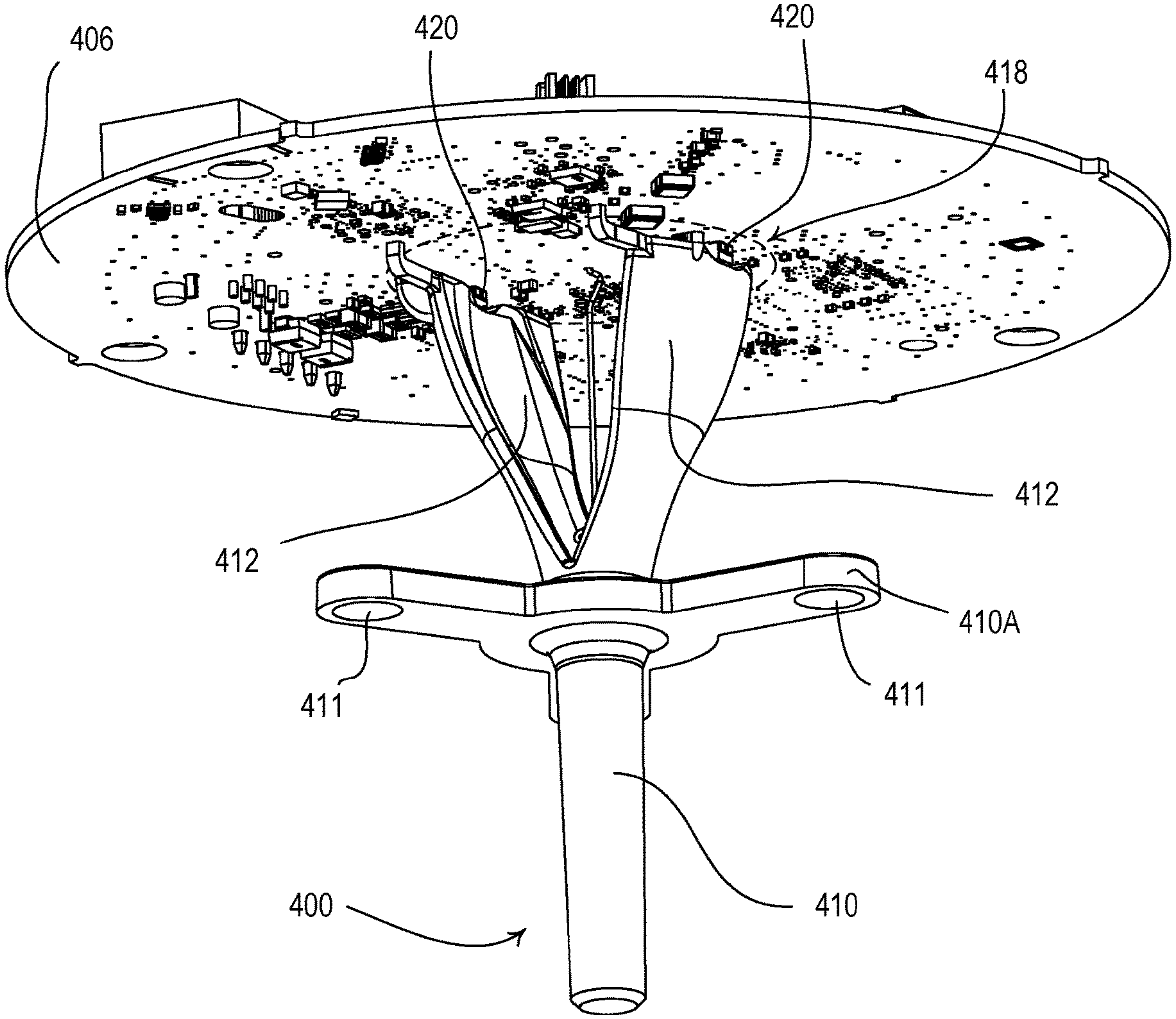
FIG. 7 is another perspective view of the printed circuit board and antenna structure of the system controller with a reflective shroud for the light pipe that transmits light energy to the light-transmissive cover removed.

The light pipe 412 is shown in greater detail in FIG. 7 and the reflective shroud 414 is shown in greater detail in FIG. 6. The reflective shroud 414 comprises a rounded conically-shaped member that surrounds the light pipe 412. The reflective shroud 414 includes support portions 414A that abut parts 410A of the light-transmissive cover 410 as shown in FIGS. 5 and 6. The parts 410A and 414A are aligned by tubular parts 404B projecting upwardly from lower housing part 404. The tubular parts 404B are received in aligned openings 1811 in the parts 410A and 414A. In FIG. 7, the reflective shroud 414 is shown removed and the light pipe 412 is exposed. The light pipe 412 comprises a rounded partly conical section with cut-away portions. The light pipe 412 is made of a suitable plastic material (e.g., an optically clear plastic material having a high refractive index) for conveying the light energy from light sources disposed on the printed circuit board 406. The light sources may be light-emitting diode packages 420 that are mounted to the printed circuit board 406. The light-emitting diode packages 420 may each include three color light-emitting diodes and can emit light based upon combining three colors red, green and blue (R, G and B), essentially to provide nearly all colors of the visible spectrum, as well known, by combining different intensities of the three color light-emitting devices. The light energy from the light-emitting diodes of the light-emitting diode packages 420 is transmitted into the light pipe 412. The printed circuit board 406 may be provided with reflective material, e.g., white electrically non-conductive paint, in a circular area 418 shown by the dashed lines adjacent the light pipe 412, as shown in FIG. 7 to enhance light collection by the light pipe 412.

Figure 8:
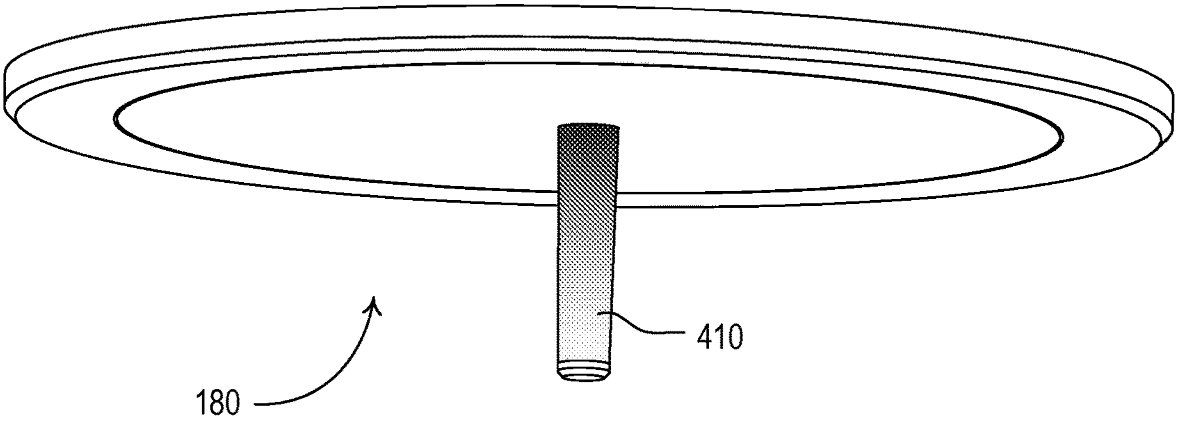
FIGS. 8 and 9 show different illuminated states of the antenna cover for visually providing information to the occupant concerning the status of the system controller.
Figure 9:
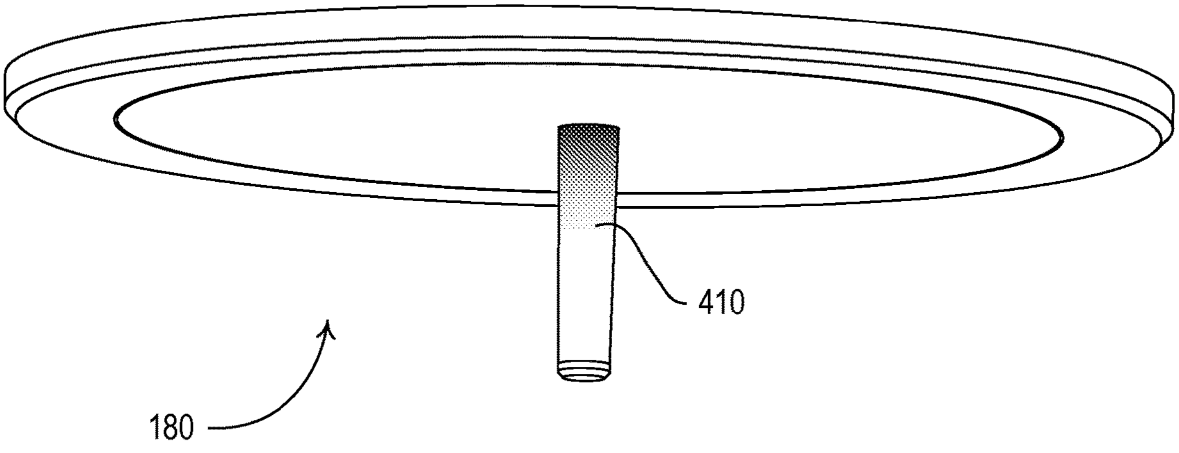

The light energy from light-emitting diode packages 420 is conveyed through the light pipe 412 into the light-transmissive cover 410. FIGS. 8 and 9 show example modes of display. FIG. 8 shows the light-transmissive cover 410 at a high intensity, so that the entire cover is displaying light energy. FIG. 9 shows the light-transmissive cover 410 displaying light energy at a reduced intensity. The color and color combination, for example, red, blue, orange, green, etc., as well as the blinking frequency and illumination levels, convey information to the occupant of the room concerning the functional status of the controller, as described below.

Figure 10:
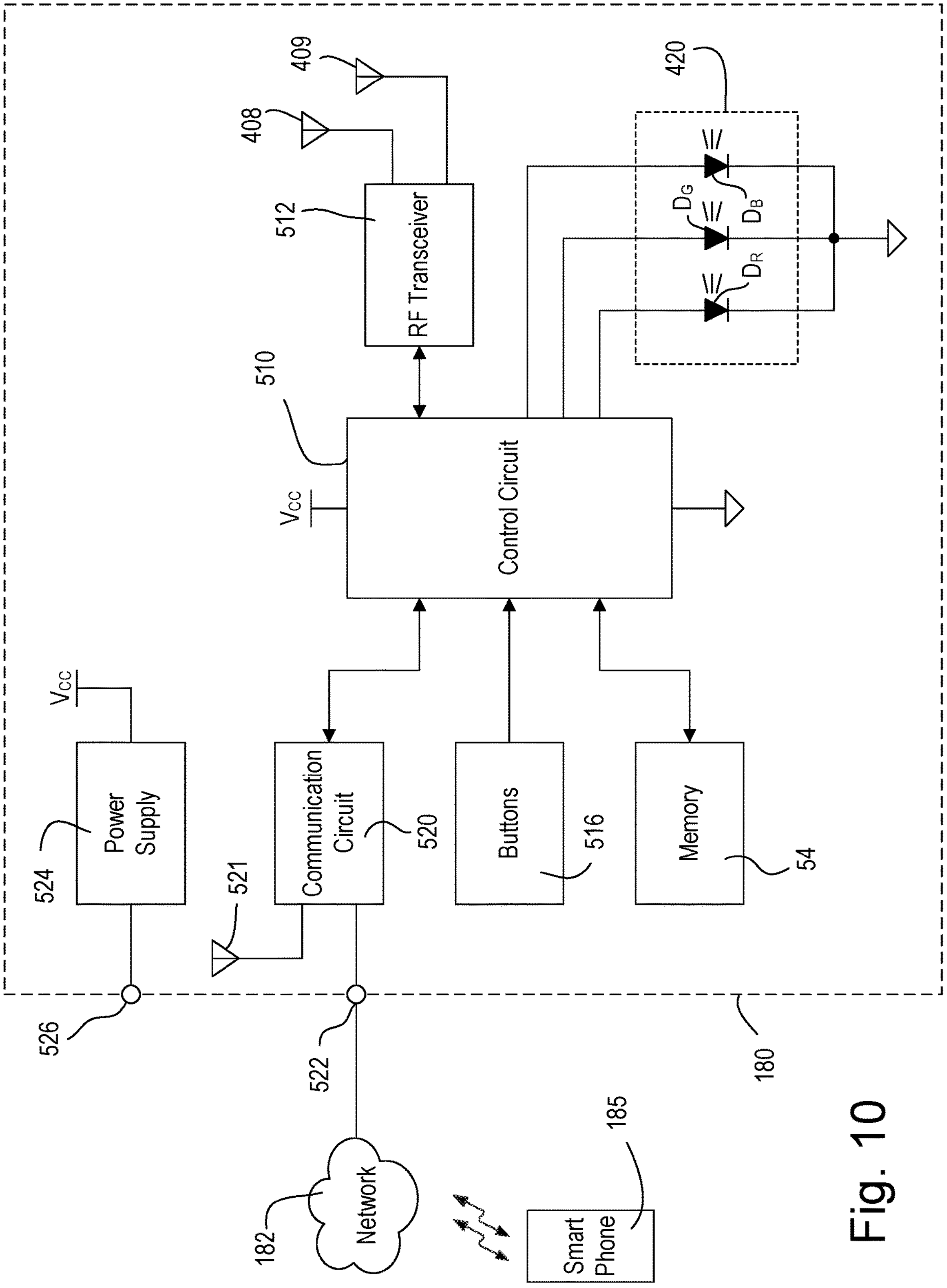
FIG. 10 is an electrical block diagram of the system controller.

FIG. 10 is a simplified example block diagram of the system controller 180. The system controller 180 includes a control circuit 510 (e.g., a processor circuit), which may alternatively comprise a microprocessor or microcontroller, a programmable logic device (PLD), an application specific integrated circuit (ASIC), a field-programmable gate array (FPGA), or any suitable processing device or control circuit. The control circuit 510 is coupled to RF transceiver circuit 512, which may be coupled to the antenna 408, as well as a second antenna 409 for transmitting and receiving RF signals. The system controller 180 (as well as the load control devices) are configured to transmit digital messages in predetermined time slots according to a time division technique.

In addition to antenna 408 covered by the light-transmissive cover 410, a further antenna 409 may be provided that is arranged orthogonally to antenna 408. The orthogonal arrangement of the antennas maximizes the reliability of the RF communications of the system controller, as explained in commonly-assigned U.S. Patent Application Publication No. 2014/0001977. The two orthogonally disposed antennas can transmit and receive RF signals in the same or different time slots. The second antenna 409 may be arranged as a conductor or conductive trace on PCB 406, thereby providing an orthogonal orientation to antenna 408.

As shown in FIG. 10, the control circuit 510 is configured to illuminate the antenna cover 410 via light-emitting diodes $D_R$, $D_G$, $D_B$ in the light-emitting diode package 420 to provide feedback to the occupant. Only one light-emitting diode package 420 is shown in FIG. 10, although two are provided in the embodiment shown in FIGS. 4-7. The system controller 180 may also comprise an audible sound generator for providing feedback to the user during configuration and normal operation. The control circuit 510 is also coupled to a memory 518 for storage of the operating characteristics of the system controller 180. The memory 518 may be implemented as an external integrated circuit (IC) or as an internal circuit of the control circuit 510. The control circuit 510 is operable to be connected to the network communication link 184 via a communication circuit 520 (e.g., an Ethernet communication circuit) and a network connection port 522. In addition, communication circuit 520 includes a suitable wireless communication circuit, e.g., WIFI or Bluetooth, connected to a further antenna 521. The communication circuit 520 allows the system controller 180 to communicate with a network device, such as a network router or a smart phone, e.g., an IPHONE or Android device or other smart phone or other wireless computing device.

As shown in FIG. 10, a network device (e.g., a smart phone 185) or other computing device (e.g., tablet, PC, desktop, etc.) can communicate wirelessly with the communication circuit 520 to allow the occupant to interface with the system controller. For example, the smart phone 185 can communicate with communication circuit 520 via a cellular network that is included in network 182 or via a wireless connection such as a WIFI or Bluetooth wireless connection. Alternatively an application can be downloaded from the network 182 to the smart phone 185 or other computing device to allow the smart phone or other computing device to directly control the system controller via a wireless link such as WIFI or Bluetooth.

The system controller 180 includes an input from user controls 516, for example, power on/off and a power supply 524 for providing the necessary DC voltages for powering the control circuit 510 as well as all other circuitry shown in FIG. 10. The power supply 524 can be connected to a suitable AC power source or another source of power by connection 526, for example, DC voltage provided by batteries.

The control circuit 510 provides signals to the light-emitting diode package 420 for controlling the individual light-emitting diodes $D_R$, $D_G$, $D_B$ to illuminate the light-transmissive cover 410 (e.g., to provide feedback to a user). As previously mentioned, each light-emitting diode package 420 may comprise three diode elements $D_R$, $D_G$, $D_B$ that emit visible light in the red, green and blue portions of the visible spectrum. As well known, by suitably illuminating the diode elements, light energy in a large portion of the visible spectrum can be generated. For example, any desired protocol, i.e., colors, color combinations, blinking frequency, can be employed.

During the boot process when the system controller 180 is being set up, when the system controller is in the secondary program loader (SPL) mode or the microprocessor-boot (u-boot) mode, the pattern of visible light displayed on the light-transmissive cover 410 may be a solid red. Once the operating system (e.g., LINUX) kernel is started, the pattern of visible light may be light orange or yellow.

Once the system controller 180 has entered normal operation, the light-transmissive cover 410 may be illuminated with a periodic white blink, for example, a 200 millisecond blink for every ten seconds. During a "device identify" mode, load control devices and other devices of the load control system 100 may be assigned to the system controller 180. This mode may be identified by the light-transmissive cover 410 being illuminated by a blinking orange, for example, a hundred millisecond blink every 200 milliseconds.

When the firmware of the system controller 180 is being updated, for example, from the network 182 via the smart phone 185, an alternating pattern between blue and white may be provided on the light-transmissive cover 410, for example, one second blue, and then one second white. When the system controller 180 is in end-of-line (EOL) mode, all three light colors may of the light-emitting diodes of the light-emitting diode package 420 be cycled through, that is red, green and blue at a frequency of one hertz, for example. This enables the user to check for proper operation of the light-emitting diodes of the light-emitting diode package 420.

When a wired connection is established, the light-transmissive cover 410 may be illuminated white for ten seconds, for example. A wired connection can be, for example, connection to the network 182. When a device (e.g., input device or load control device) connects to the system controller 180, the light-transmissive cover 410 may be illuminated with a blinking green, for example, 400 milliseconds every two seconds or if it is a new device, 400 milliseconds every ten seconds.

If the system controller 180 is in out-of-box (OOB) mode, the illuminated antenna will alternate between red and green, for example, two seconds green and two seconds red. The out-of-box mode means the device is being configured into an as-sold default state.

In the recovery mode, the light pattern on the light-transmissive cover 410 is shown as a solid blue. Recovery mode is similar to the "Safe" mode or BIOS used in a PC to recover the operating system. If there is a critical error, the light-transmissive cover 410 may be illuminated with a solid red and after a specified time, for example, three days in the error mode, the color will go to a dimmer intensity. Such a critical error may comprise, e.g., a critical hardware error (such as, memory failure) or a critical system error.

The colors, color combinations, and color patterns shown are merely examples. Any colors, color combinations or color patterns can be chosen, as will be evident to one of skill in the art. As also explained, the light-transmissive cover 410 can be illuminated any suitable color combination or pattern of colors.

The load control devices may be associated with the system controller 180 during or after the configuration procedure of the load control system 100. The load control devices that are associated with the system controller 180 are responsive to the digital messages transmitted by the system controller. For example, one of the load control devices may be associated with the system controller 180 by actuating a button on the load control device until the load control device enters an association mode, and then actuating a button on a display of a smartphone communicating with the system controller. The system controller 180 may transmit a broadcast address to the load control device, which may then save the broadcast address received from the system controller. The system controller 180 will flash the "device identify" pattern when the association with the load control device is completed.

Alternatively, the system controller 180 could be first put into an association mode via a smart phone and then could repetitively transmit out the broadcast address in the association mode. The load control devices could each save the broadcast address received from the system controller 180 if an actuator on the load control device is actuated while the system controller is repetitively transmitting the broadcast address in the association mode.

After being associated with the load control devices of the load control system 100, the system controller 180 is operable to transmit a digital message including one of a plurality of operating modes to the load control devices. The load control devices automatically operate according to one of a plurality of control algorithms in response to receiving a digital message including one of the operating modes from the system controller 180. For example, the system controller 180 may be coupled to a central controller or processor (not shown) via the network 182 for receiving the operating modes to transmit. Alternatively, the system controller 180 could transmit one of the operating modes to the load control devices in response to digital messages received from a building or energy management system coupled to the network 182, in response to digital messages received from a remote “cloud” server via the Internet, or in response to the contact closure signal received via the contact closure input. The load control devices are operable to control the respective loads in response to the present operating mode and one or more operating characteristics that are stored in a memory of the load control device.

In addition, the system controller 180 may be operable to transmit digital messages including commands for controlling the associated loads to the load control devices. For example, the commands may include a command to turn the load on or off, a command to adjust the amount of power delivered to the load, a command to increase or decrease a setpoint temperature of a heating and cooling system, a delay time (e.g., a time from when the command is received to when the load is controlled), and a fade time (e.g., the amount of time over which the load is adjusted from an initial value to a target value).

The system controller 180 may also provide centralized timeclock control of the load control system 100. For example, the system controller 180 could periodically transmit the present time of the day to the load control devices. Each load control device could be programmed with a timeclock schedule for controlling the electrical loads in response to the present time of the day transmitted by the system controller 180. The timeclock schedule may be stored in the memory 518 of the system controller 180. The system controller 180 could comprise an astronomical timeclock or could receive the time of day information from the cloud server via the Internet. In addition, rather than transmitting the present time of day to the load control devices, the system controller 180 could store a timeclock schedule for controlling the electrical loads and could transmit alternative commands to the load control devices in response to the present time of the day. For example, the system controller 180 could transmit Sweep On or Sweep Off commands to the load control devices per the timeclock schedule to turn one or more of the electrical loads on and off, respectively, at the end of the work day. Further, the system controller 180 could transmit one of the operating modes to the load control devices in response to the timeclock schedule. In one or more embodiments, the system controller 180 may include one or more processor (or controller) devices, one or more memory, at least one power supply, and/or one or more wireless communication transceivers (that may be in communication with the antennas 408, 409). The one or more processor devices may be configured to perform various functions, such as but not limited to those functions associated with timeclock functions and/or demand response functions.

While the present application has described the light-transmissive cover 410 that houses the antenna element 408 and is illuminated to provide feedback and/or visible information to a user, other protruding structures of a wireless control device may be also illuminated to convey information. For example, a wireless control device may comprise a different light-transmissive protruding structure that may be housed in a cover that extends, for example, at least approximately 0.5 inches from a surface of a housing of the wireless control device.

What is claimed is:

1. A device, comprising:
- a housing defining an enclosure;
- a light-transmissive cover coupled to and extending from the housing;
- at least one circuit board disposed within the enclosure defined by the housing, the at least one circuit board including
  - a light source configured to illuminate at least a portion of the light-transmissive cover with visible light,
  - a communication circuit, and
  - a controller in signal communication with the light source and the communication circuit, the controller configured to control operations of the communication circuit and the light source; and
- an antenna including a first portion and a second portion, the first portion of the antenna coupled to the communication circuit disposed within the housing, and at least part of the second portion of the antenna disposed within the light-transmissive cover.

2. The device of claim 1, wherein the housing includes a first housing part and a second housing part that together define the enclosure when coupled together, and wherein the light-transmissive cover is coupled to at least one of the first housing part or the second housing part.

3. The device of claim 2, wherein the second housing part is removably coupled to the first housing part.

4. The device of claim 3, wherein the first housing part is sized and configured to be recessed into an opening of a building structure.

5. The device of claim 1, wherein the controller is configured to operate the light source in a first mode and a second mode that is different from the first mode.

6. The device of claim 5, wherein the first mode includes illuminating a first portion of the light-transmissive cover and the second mode includes illuminating a second portion of the light-transmissive cover that is different from the first portion of the light-transmissive cover.

7. The device of claim 1, wherein the device includes a light pipe configured to direct visible light emitted from the light source into the light-transmissive cover.

8. The device of claim 7, wherein the device includes a reflective shroud that at least partially surrounds the light pipe, the reflective shroud configured to reflective visible light from the light source into the light pipe.

9. The device of claim 7, wherein the light pipe includes a first second and a second section, at least one of the first section and the second section being frusto-conical.

10. The device of claim 1, wherein the light source includes at least one light emitting diode (LED).

11. The device of claim 1, wherein the controller is configured to operate the light source to provide visible communication of a functional status of the device.

12. The device of claim 11, wherein the function status includes at least one of a startup boot mode, a normal mode, or an error mode.

13. The device of claim 12, wherein, in the error mode, the light-transmissive cover displays information relating to at least one of a hardware error or a software error.

14. The device of claim 12, wherein, during the startup boot mode, the light-transmissive cover displays information relating to a state of a boot process of the controller.

15. The device of claim 1, wherein the second portion of the antenna includes a helical structure.

16. A control device comprising:

a housing comprising:

a base portion having a first part and a second part, the first part of the base portion configured to be disposed within a structure, and the second part of the base portion configured to be coupled to the first part, the first part and the second part of the base portion defining an enclosed volume when coupled together; and a light-transmissive cover extending from a surface of the second part of the base portion;

a light pipe;

a wireless communication circuit disposed within the enclosed volume defined by the base portion;

an antenna coupled to the wireless communication circuit and configured to communicate wireless signals, the antenna configured to extend along a length of the light-transmissive cover such that the light-transmissive cover surrounds at least a portion of the antenna;

a control circuit coupled to the wireless communication circuit and configured to control a generation of signals by the wireless communication circuit to be transmitted by the antenna; and one or more light emitting diodes (LEDs) coupled to the control circuit and be disposed within the enclosed volume of the base portion, the one or more LEDs configured to provide visible light energy into the light pipe for illuminating the light-transmissive cover.

17. The control device of claim 16, wherein the antenna includes a first portion disposed within the enclosed volume of the base portion and a second portion that extends along the length of the light-transmissive cover.

18. The control device of claim 16, wherein the device includes a reflective shroud that at least partially surrounds the light pipe.

19. The control device of claim 16, wherein the LEDs are configured to illuminate a first portion of the light-transmissive cover in a first mode of operation and to illuminate a first portion and the second portion of the light-transmissive cover in a second mode of operation.

20. The control device of claim 16, wherein the light pipe includes two partial substantially frusto-conical sections.

* * * * *